(12) United States Patent  
Hill

(10) Patent No.: US 12,045,774 B2
(45) Date of Patent: Jul. 23, 2024

(54) INVENTORY MANAGEMENT SYSTEM

(71) Applicant: PROKITS SOURCING COMPANY, Milton, FL (US)

(72) Inventor: Ray Hill, Milton, FL (US)

(73) Assignee: PROKITS SOURCING COMPANY, Milton, FL (US)

( * ) Notice: Subject to any disclaimer, the term of this patent is extended or adjusted under 35 U.S.C. 154(b) by 238 days.

(21) Appl. No.: 17/612,965

(22) PCT Filed: May 22, 2020

(86) PCT No.: PCT/US2020/034327
§ 371 (c)(1),
(2) Date: Nov. 19, 2021

(87) PCT Pub. No.: WO2020/237190
PCT Pub. Date: Nov. 26, 2020

(65) Prior Publication Data
US 2022/0253793 A1      Aug. 11, 2022

Related U.S. Application Data

(60) Provisional application No. 62/851,455, filed on May 22, 2019.

(51) Int. Cl.
*G06Q 10/087* (2023.01)
*B25H 3/02* (2006.01)
*G06T 7/00* (2017.01)
*G06V 20/52* (2022.01)

(52) U.S. Cl.
CPC ........... *G06Q 10/087* (2013.01); *B25H 3/028* (2013.01); *G06T 7/0008* (2013.01); *G06V 20/52* (2022.01); *G06T 2207/30164* (2013.01); *G06T 2207/30232* (2013.01)

(58) Field of Classification Search
CPC .... G06Q 10/087; B25H 3/028; G06T 7/0008; G06T 2207/30164; G06T 2207/30232; G06V 20/52
USPC .......................................................... 705/28
See application file for complete search history.

(56) References Cited

U.S. PATENT DOCUMENTS

2013/0328661 A1*  12/2013  Phillips ................. G06F 3/0486
                                                                 715/769

FOREIGN PATENT DOCUMENTS

EP           3496012        *    7/2009

* cited by examiner

*Primary Examiner* — Garcia Ade
(74) *Attorney, Agent, or Firm* — HOGAN LOVELLS US LLP

(57) ABSTRACT

Various embodiments of systems and methods allow a tool inventory device and associated system. A user can retrieve and return tools and such interactions can be monitored by the system. The inventory device can be an add-on to a standalone tool cabinet and can provide this extra functionality. The inventory device can have a camera looking at the drawers and can use computer vision to determine when tools are retrieved and/or replaced.

20 Claims, 11 Drawing Sheets

(Bottom View)

INVENTORY MANAGEMENT SYSTEM

RELATED APPLICATIONS

This application is a U.S. National Phase under 35 U.S.C. § 371 of International Application PCT/US2020/034327 filed on May 22, 2020; which claims priority to U.S. provisional application 62/851,455, which was filed on May 22, 2019, which are incorporated herein in their entirety. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

BACKGROUND OF THE INVENTION

Assembling and maintaining modern machines can require a vast array of tools. Organizing and inventorying these tools can provide significant overhead for workers who may need dozens of tools for a single task. Misplaced tools can cause significant problems to an operation. Searching for a lost tool decreases productivity and tools may have a significant replacement cost. In some situations, a misplaced tool may be left inside a machine which can have disastrous consequences, as is the case with tool "foreign object damage," which might occur when a wrench is left in a jet engine.

Organizations may employ tool room attendants to guard, maintain, organize, and inventory tools. Organizations may utilize a manual process of checking out and checking in tools through a log. These and other approaches to tool management can significantly reduce productivity, increase overhead, or have significant up-front costs. Moreover, many approaches are unacceptably susceptible to operator error.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1A:
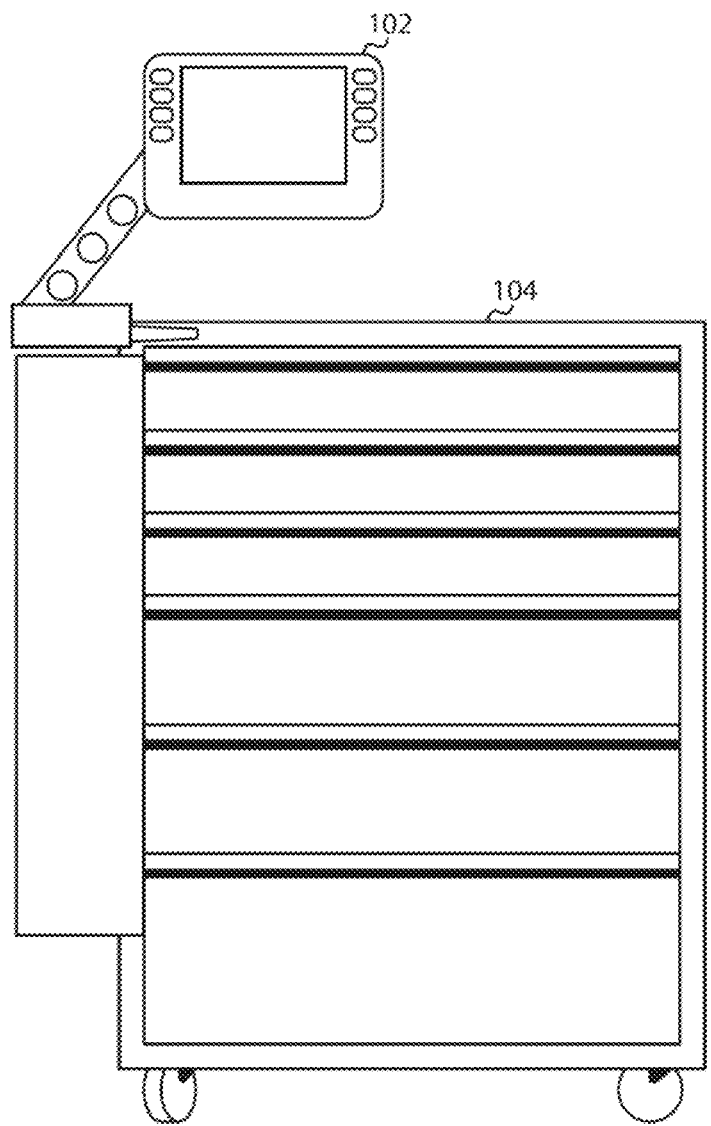
FIGS. 1A and 1B illustrate an exemplary inventory device and tool cabinet.
Figure 1B:
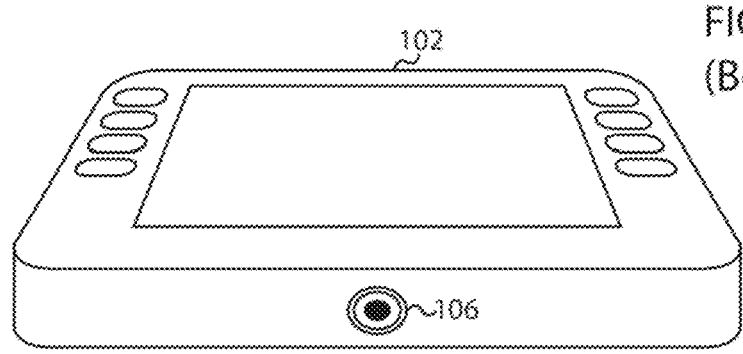

FIGS. 1A and 1B illustrate an example inventory device 102 and tool cabinet 104. An inventory device 102 can monitor the inventory of the tool cabinet 104. The inventory device 102 can be attached to a standard tool cabinet to provide the tool cabinet 104 with the advanced features described herein. The inventory device 102 can include a downwards facing camera 106 that can provide a view of drawers or compartments of the tool cabinet 104 for monitoring tool transactions.

Figure 10:
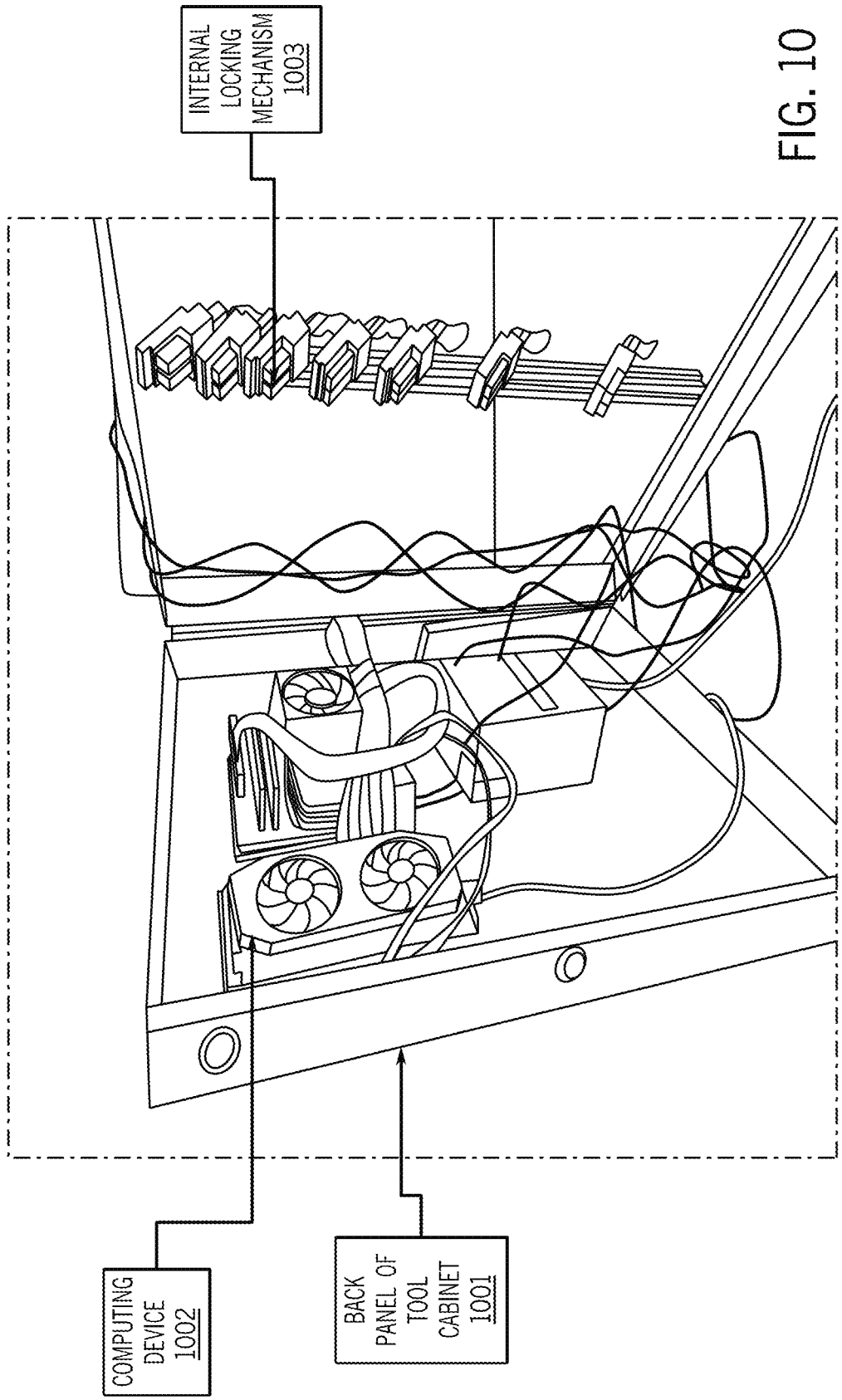
FIG. 10 illustrates an exemplary an exemplary tool cabinet showing a back panel housing a computing device and also showing internal drawer locks.

The inventory device 102 can provide a human user interface for engaging an inventory system. By operating the inventory device 102, an authorized user can retrieve and return tools. The inventory device 102 can include various sensors, communication interfaces, and computing components for receiving inputs, processing those inputs, and generating outputs. The inventory device 102 can include a phone, tablet, laptop, and/or other computing device. In some embodiments, the computing device is located is another location than the inventory device 102 and is connected wired or wireless to the inventory device. For example as seen in FIG. 10, the computing device 1002 is located in a back panel 1001 of the tool cabinet. This may be desirable when a bigger computing device is desired than what can fit inside the inventory device or in instances when it is desired to have the computing device inaccessible to the tool cabinet user. The back panel 1001 can be installed with a locking mechanism so as to restrict access. Also the back panel can be added aftermarket to existing tool cabinets. In this instance, when the computing device is not located in the inventory device 102, the inventory device still contains a user interface for engaging the inventory system, such as a touch screen, buttons, etc.

The inventory device 102 can include a downwards facing camera 106 for inventory tracking. The camera 106 can be attached to the inventory device 102, the tool cabinet 104, or elsewhere in the environment. Such a camera 106 can be directed towards the tool cabinet 104. The camera 106 can be positioned to afford a view of each of the drawers of the tool cabinet 104. Before the door is opened (e.g., with a camera 106 positioned within the tool cabinet 104), as the door is opened, and/or immediately after the door has opened, the camera 106 can take an image representing the starting state of that drawer. At the end of a transaction (e.g., before, during, and/or after the closing of the drawer), the inventory device 102 can take another image representative of the resultant state of the drawer. In comparing information from the starting state and the resultant state, an inventory system can determine the total change that occurred during the transaction. The system can determine which tools were taken, which were returned, and if a tool was improperly returned (e.g., a tool was placed in an incorrect position). The system can determine if a tool was returned in an unsatisfactory condition (e.g., with damage or blemishes). The system can determine if maintenance is required for a tool. The inventory device 102 can record sequences of images, including video, of a transaction.

The camera 106 can have a wide-angle field of a view or a narrower field of view. The camera 106 can have a variable field of view (e.g., digital or optical zoom). The camera 106 can automatically zoom and/or focus on relevant drawer or region. For example, the inventory device 102 can determine that a certain drawer is opened and the camera can zoom so that the specific drawer will be in-frame and in-focus.

Various techniques can assist the camera 106 in imaging the tools. For example, lights on the tools and/or cabinet can assist in identifying tools. The tool cabinet 104 can have a light that illuminates drawers. A reflective coating can be placed on tools and/or tool locations to assist with the imaging. A bright or reflective coating can be applied to drawers of the tool cabinet 104 and foam inserts can have a darker appearance such that tool locations (where the foam insert is cut-out) appear bright and are easier to identify with the camera. Other high-contrast techniques are contemplated. An image tag such as a QR code can be printed on tools, tool locations, drawers, etc.

The inventory device 102 can include multiple cameras for inventory control. For example, an array of cameras can provide a wider coverage area than a single camera. This could be beneficial when the camera has a limited field of view that cannot satisfactorily cover the entire tool storage area (e.g., drawers). Multiple cameras can also be used to generate or augment a three-dimensional model of the tool cabinet 104 and tools contained therein. The inventory device 102 can utilize other depth camera technologies such as an infrared camera combined with an infrared projector (the projector can be located a few centimeters to a side of the projector); the infrared camera can then detect deformations in the infrared projections and derive a three-dimensional picture based on the deformations. Multiple cameras can also be useful in overcoming occlusions from debris or a user's hand. Lidar can also be utilized for three-dimensional scanning.

Imagery from multiple cameras can be stitched together to form a complete image of a drawer. Imagery from a single camera taken at different times can be stitched together. Markers on the drawers can be used to assist in stitching images together.

In addition, the inventory device may have multiple cameras for different purposes. For example, one or more cameras can be used to identify the user and one more different cameras can be used for inventory control. Or multiple cameras can be used that provide both functions of user identification and inventory control.

The inventory device 102 can include radio frequency identification (RFID) capabilities. For example, the inventory device 102 can read and write RFID tags affixed to or embedded within tools. Tools can be brought to a reader of the inventory device 102 for checkout and check-in processes. Alternatively or additionally, the inventory device 102 can automatically track tools as they are retrieved or returned to the tool cabinet 104. For example, the system can, when all drawers are closed, detect all the tools within the tool cabinet 104. This can provide initial and final states of tools to determine which ones have been extracted or returned.

The tool cabinet 104 can contain sensors at each tool location. For example, a drawer can have multiple cutouts for tools and each tool can include a button or other sensor for detecting whether a tool is present in that location.

The inventory device 102 can include a depth sensor such as an ultrasound sensor to determine distances of objects from the inventory device 102. The inventory device 102 can use data from the depth sensor to determine which drawer is open. For example, if the inventory device 102 is located above the top drawer of the tool cabinet 104, as the distance detected by the depth sensor increases, the inventory device 102 can determine that lower drawers are being accessed. A camera or array of cameras can similarly determine which drawer is accessed.

A fusion of sensors can provide redundancy and increase accuracy for the system. For example, one sensor might be accurate for certain types of tools but inaccurate for other types of tools. For example, the system might have a low-resolution three-dimensional imaging system and a high-resolution two-dimensional imaging system. By using the two sensors, the system can get a more thorough understanding of the state of tools within the tool cabinet 104. Other sensor-fusion techniques are contemplated such as RFID and image sensors, contact sensors (e.g., at each tool cutout) and image sensors, etc.

The inventory device 102 can include authentication sensors for authenticating users of the tool cabinet 104. Authentication sensors can determine the identity of a user of the tool cabinet 104. Once the identity is determined for a user, the tool cabinet 104 can provide access to tools for the user. Each user might have different access permissions which can restrict the tools, drawers, cabinets, etc. that the user is authorized to access. These access permissions can be based on a current task of the user, a time of day or day or the week, a group the user is assigned to (e.g., an assistant mechanic group or supervisor group), a location of the tool cabinet 104 (e.g., if the tool cabinet is mobile or semi-mobile as determined by GPS, certain tools may be inappropriate for certain sites), etc. When a transaction occurs (e.g., taking or returning tools) the system can associate the transaction with the authenticated user.

While a single authentication sensor can be utilized, there are benefits to having multiple authentication sensors. For example, multiple sensors can provide various options for authentication in case circumstances limit the ability to user certain sensors. This might occur if the user is wearing gloves and cannot user a fingerprint sensor, if the users face is obscured (e.g., if the user is wearing a protective mask), in a loud environment, etc. Multiple sensors can provide multi-factor authentication. For example, the user might be required to provide a PIN after getting a facial scan. When a user is first authenticated for the day or task, they can be required to provide greater authentication (e.g., a password and fingerprint) whereas later authentications can require limited authentication (e.g., a spoken PIN or verbal confirmation).

The inventory device 102 can perform authentication tasks locally (e.g., within the inventory device 102). Additionally or alternatively, the inventory device 102 can provide authentication information to a separate device in the system which can analyze the information and provide instructions to the inventory device 102. The inventory device 102 can be a terminal to interact with an inventory control system. The inventory device 102 can perform preprocessing tasks on authentication data. Pre-processing can include compressing data to minimize bandwidth usage. For example, the device can receive raw fingerprint data from the sensor and transform the raw data into a vector representing key features of the fingerprint data before transmission to a server.

The inventory device 102 can include at least one camera directed towards the user. For example, a camera can be directed parallel to the ground and can observe users as they operate the inventory device 102 and access tools. Such a camera can authenticate users using facial recognition, visual behavior analysis (e.g., gate detection or other analysis of how a user moves), and/or other techniques. The camera directed towards the user can record a video of the user as the user interacts with the tool cabinet 104. Data from the user camera and the inventory camera can be combined to generate a more complete view of the interaction. A single camera can be used that can automatically or manually rotate from user-facing to tool cabinet-facing. There can be multiple cameras directed towards the user. The camera or cameras can be used to generate a three-dimensional picture.

The inventory device 102 can include a set of buttons and/or touchscreen for receiving a passcode from a user. For example, the user can input a PIN associated with their account. The speed and cadence which the user inputs their PIN via the buttons can also be used in a behavioral analysis to authenticate the user. These buttons can be dual-purpose and be used for navigating the inventory device 102.

The inventory device 102 can include a microphone. The microphone can enable voice authentication. The microphone can be used for user interaction. The system can analyze the user's voice pattern and determine if it matches a user on file. The system can also interpret the voice data to determine the identity of the user. The system can determine an intent of the user based on speech recognition and natural language processing.

Other authentication devices of the inventory device 102 can include a fingerprint reader, an iris scanner, magnetic reader for reading a magnetic strip of a keycard, a wireless receiver for detecting the presence of a keycard or other authentication key device, etc.

The inventory device 102 can be welded, bolted, glued, or otherwise attached to a standard tool cabinet. In some embodiments, the inventory device 102 can be configured to enable attachment to a variety of makes or models of cabinet. Not all components of inventory device 102 need to be entirely affixed to the cabinet. For example, at least a portion of the inventory device 102 can be handheld (e.g., a handheld scanner). At least a portion of the inventory device 102 can be located elsewhere (e.g., cameras can be attached to the ceiling overlooking the tool cabinet 104; the computing device can be located in back panel of the tool cabinet or could be located in a different location altogether and communicated wirelessly to the inventory device and the tool cabinet). The inventory device 102 can be a system that is next to or near the tool cabinet 104, even if not physically affixed to the tool cabinet 104.

The inventory device 102 can interface with the tool cabinet 104. The inventory device 102 can engage static physical characteristics of the tool cabinet 104 such as bolts, holes, or other features. The inventory device 102 can interface with (i.e., operate) handles, latches, locks, drawers, etc. of the tool cabinet 104. The inventory device 102 can interface with the tool cabinet 104 using electronic means. For example, the inventory device 102 can connect to a digital interface of the tool cabinet 104 which can provide the inventory device 102 with sensor data from sensors of the tool cabinet 104. Such a digital interface can also permit the inventory device 102 to control electronic features of the tool cabinet 104 such as locks, drawers, cameras, lights, speakers, etc. The inventory device 102 can plug into a main power receptacle of the tool cabinet 104 to receive power from the tool cabinet 104 or it can be plugged into a separate power receptacle not located on the tool cabinet.

A tool cabinet 104 can be a container designed for holding tools. While the principles disclosed herein are described relative to a "tool cabinet" it should be understood that these principles are applicable to other access control or inventory systems. While the term "tool cabinet 104" is used through this description, it should be understood that the principles herein are applicable to a variety of storage mechanisms for control of inventory. Other enclosures include storage lockers, bins, closets, rooms, etc. While physical enclosures provide some advantages regarding physical access restrictions, the principles herein disclosed can be applied to environments that lack such physical restrictions. For example, these principles can be applied to shelving units, a workbench, a warehouse, etc.

While "tools" are frequently discussed herein, other physical items can additionally or alternatively be organized and inventoried according to the principles disclosed herein. Such items can be consumable or durable. Some items are designed to be returned to the enclosure after use while others are designed to be disposed of after use. Some items are designed to be integrated into a product and so will not be immediately disposed of or returned. Items can have high capital costs such as an expensive tool. Items may have use restrictions such as narcotics at a hospital. For examples, "tool" can include medical or dental instruments or any article for which inventory for which a user would like inventory control, such as medicines, especially controlled medicines. For example, a medicine cabinet could include various medicines that are coded. When a user (such as a doctor or nurse) wishes to obtain medicine for a patient, the user after gaining access to the system, enters in the patient identification and then cabinet would then unlock the drawer or compartment that contains the medicine that has been prescribed by the doctor. For instance when the doctor prescribed a medication, the patient's medical records are updated and linked to the inventory device. This way, only the correct medicine and also only the amount needed would be made available to the user, thus assisting in the prevention of giving the patient the wrong medicine, as well as limiting access to controlled substances.

A user can be any person or entity that interacts with the inventory device 102 and/or tool cabinet 104. The user can be an employee, customer, patient, contractor, etc. of a company that controls the inventory device 102. The company can have an account for the user including an identifier of the user. Alternatively, the company that controls the inventory device 102 might not have an account for a user.

The tool cabinet 104 can be organized such that each tool is assigned a specific location in the tool cabinet 104. Groupings of tools can be located in specified locations within the tool cabinet 104. For example, a drawer of the tool cabinet 104 can be dedicated to a certain type of tool, a certain task, etc.

The tool cabinet 104 can have access restrictions to prevent unauthorized entry. Access can be itemized such that certain people can only access certain locations of the tool cabinet 104. For example, a person may have access to certain drawers of the cabinet but not to other drawers.

A tool cabinet 104 can be configured to hold tools for maintaining one machine while another cabinet can be configured to hold tools for maintaining another. Cabinets can be configured to hold one or more specific types of tools, such as wrenches, screws, power tools, etc. Cabinet drawers can similarly be organized by task, type of tool, or a combination thereof.

The tool cabinet 104 can include multiple drawers where each drawer has cutouts designed to match specific tools. The tool cabinet can have compartments instead of drawers or each drawer can have compartments that have separate looks or sensors.

The system can track the status of tools. For example, when a tool breaks, the system can automatically determine that the tool is broken. The system can determine the status through images taken of the tool. In addition, a user can notify the system that a tool requires maintenance. The system can determine, based on a log of checked-out time, when a tool is due for maintenance. The system can keep of log of tasks the tool has been used for and make maintenance decisions based on those tasks (e.g., some tasks may be harder on a tool than others).

Figure 2:
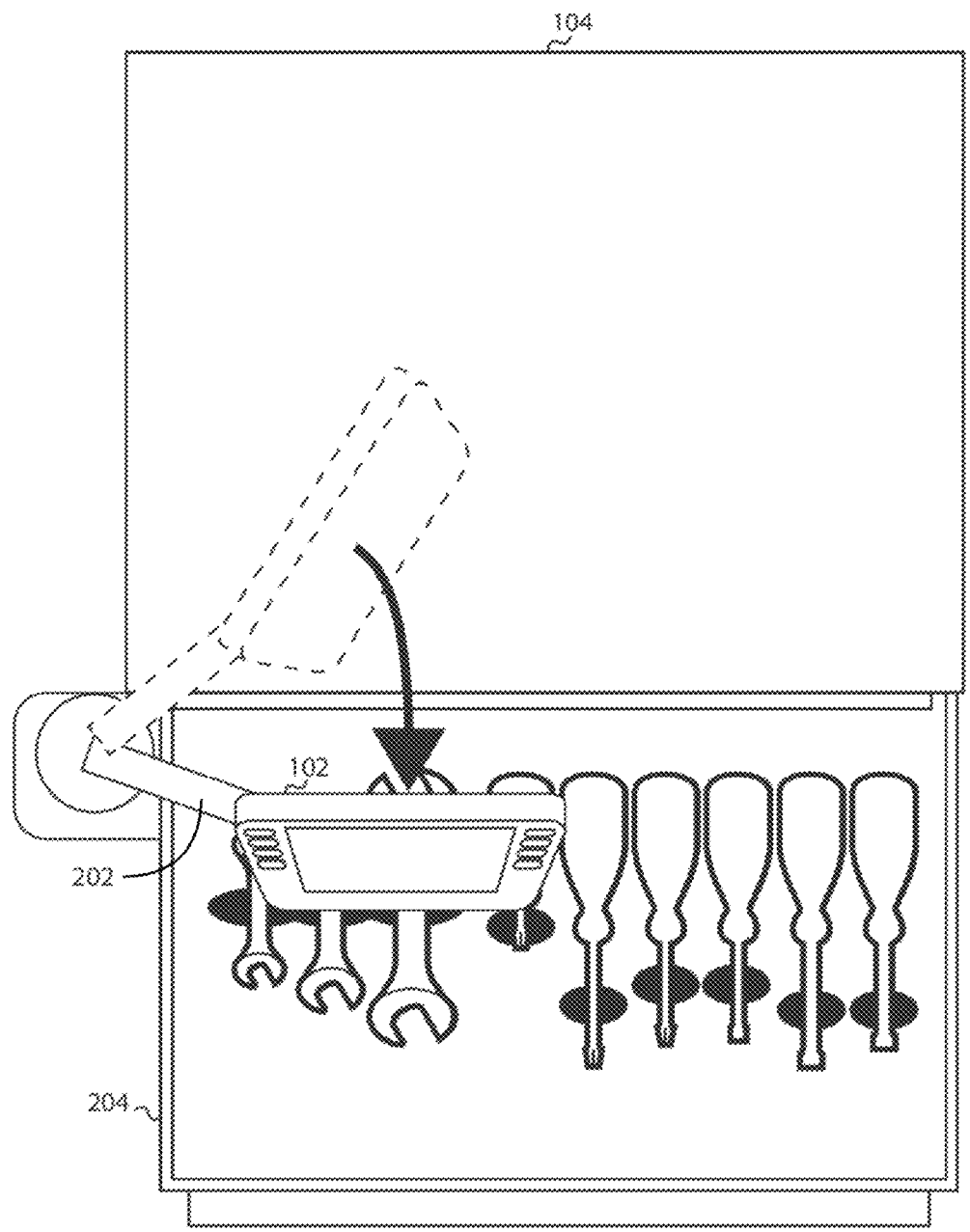
FIG. 2 illustrates movement of the inventory device from a first location to a second location using a rotating arm.

FIG. 2 illustrates movement of the inventory device 102 from a first location to a second location using a rotating arm 202. The inventory device 102 can include an armature 202 that can position the inventory device 102 in an optimal location for monitoring the tool cabinet 104. This optimal location can provide a full view of the drawers when the drawers are extended. As the optimal location might extend in front of the cabinet, it might be obtrusive while the cabinet is not being used. The armature 202 can rotate in order to move the inventory device 102 from the optimal location to a storage location that is less obtrusive when not in use. The rotation can be about a vertical axis to provide horizontal movement resulting in the inventory device 102 positioned above the cabinet. Other axes of rotation are contemplated. The inventory device 102 can also be on a slider which can translate (in addition or alternative to rotate) the inventory device 102 as appropriate. The inventory device 102 can have multiple axes of rotation which, in combination, can fold the inventory device 102 away from use. For example, it can fold alongside the tool cabinet 104.

The inventory device 102 can automatically move into the optimal position for use and automatically return to a storage position out of the way. For example, pulling a drawer open can mechanically engage a rotation system that moves the inventory device 102 into position for sensing the contents of the drawer; similarly, closing the drawer will return the inventory device 102 into a storage position. This automatic movement can be mechanical or powered (e.g., the motion can be provided or augmented by one or more motors). This movement can also be manually operated whereby a user can manually move the inventory system into position or the user could provide instructions to the inventory device either on the device itself of through wireless communications using a table or smart phone for example.

The inventory device 102, when rotated to hover above a drawer, can be centered over the drawer. Alternatively, the inventory device 102 can be off-center, as depicted in FIG. 2. To compensate for off-center positioning, camera 106 of the inventory device 102 can be directed at an angle for a better view. Digital de-skewing processes can correct image defects.

Figure 3A:
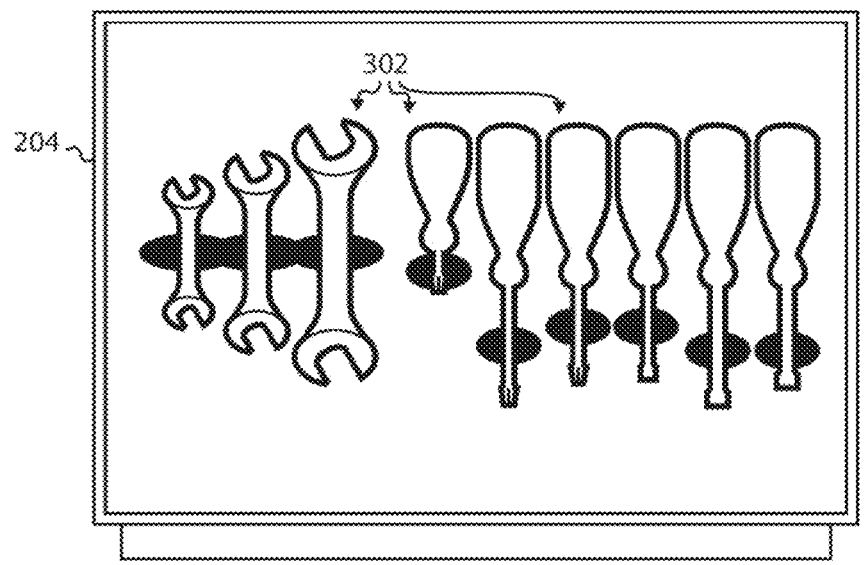
FIGS. 3A, 3B, and 3C illustrate an exemplary item tracking techniques.
Figure 3B:
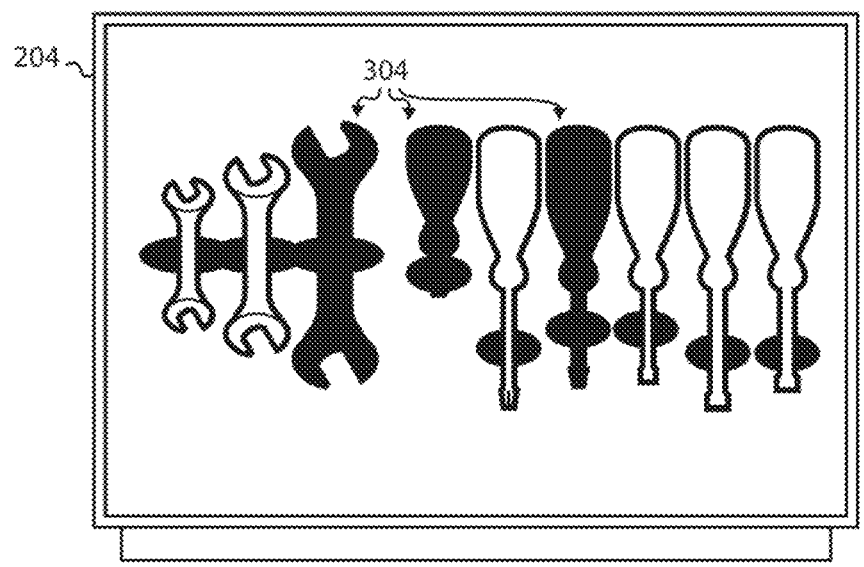
Figure 3C:
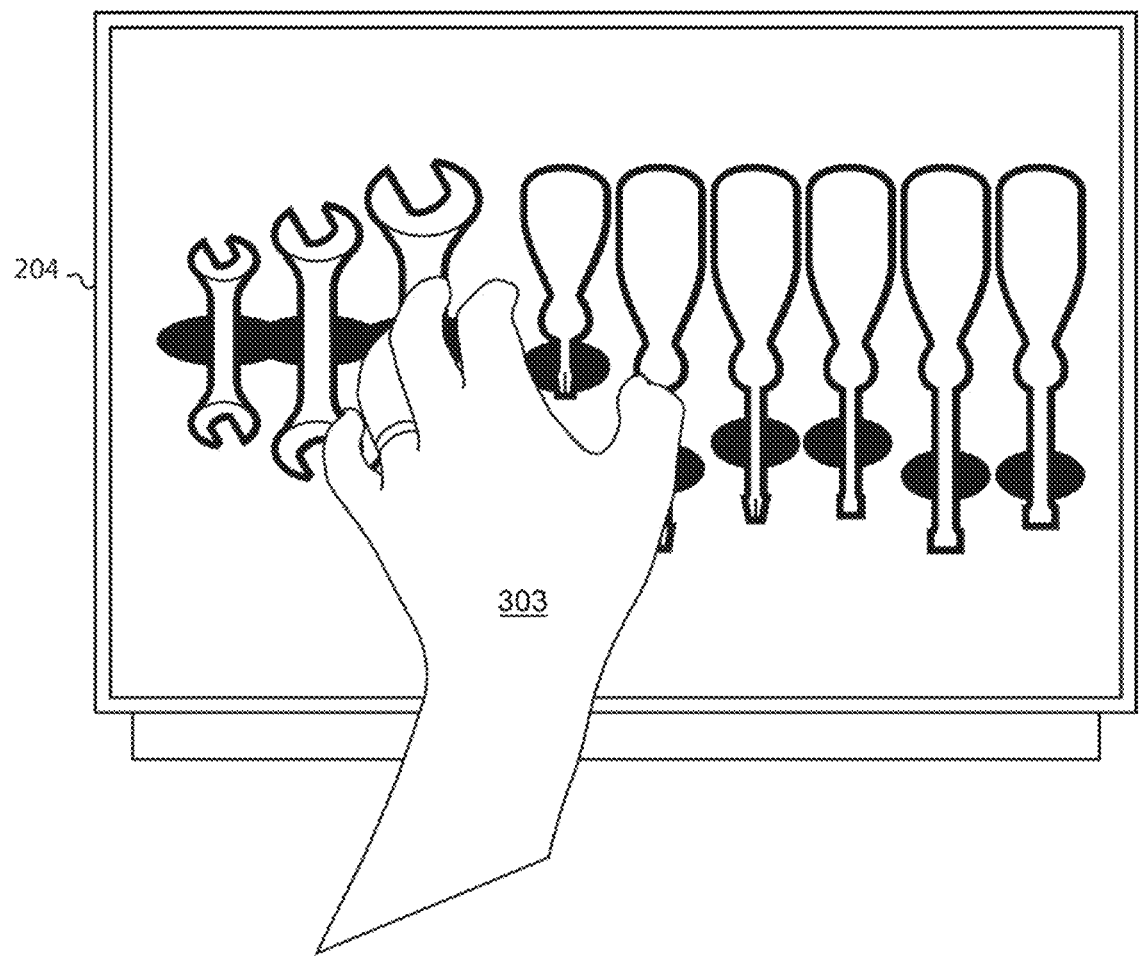

FIGS. 3A, 3B, and 3C illustrate example item tracking techniques. In FIG. 3A, a drawer 204 of tools 302 is presented. Each tool can have a respective cutout 304 that fits that tool. The tool cutouts 304 can be created by an implementer that configures the tool cabinet 104 for a client. For example, the drawer can have a foam insert that can be custom-cut. Each implementation of the system can be unique such that the inventory system must be trained regarding what drawers 204 exist for a tool cabinet 104 and what tools are placed at what positions within each drawer 204.

Multiple techniques can be utilized for configuring an inventory system to a tool cabinet 104 configuration. For example, an operator can manually provide a template image indicating what locations should house what tools. The operator can indicate that a certain screwdriver is located in drawer A at position X, Y. The system can take an image with a drawer with all the tools in and another image with the tools removed and, based on the two images, determine locations of tools and basic outlines of the tools. The system can compare later images to such images of tools-in or tools-out to determine if a tool was removed. The system can do image segmentation processes of a tools-in image to determine outlines of tool locations. The system can use neural networks and other computer vision techniques to locate tools and identify tools. The system can automatically determine a brand and type of tool through an image analysis.

The image of FIG. 3B of drawer 204, when compared to the image of FIG. 3A, can indicate that tools 302 were removed, leaving cutouts 304. Assuming FIG. 3B represents the state of the drawer 204 after a transaction that began with FIG. 3A, the system can then determine that the transaction included removal of tools 302. If FIG. 3B represents the initial state of the drawer 204, then the system can determine that tools 302 were returned to the drawer 204. The system can track transactions (e.g., user A removed tool X) and/or states (state M, followed by user A interaction, followed by state N).

As shown in FIG. 3C, the system can detect a hand 303 or a robotic arm or the like as the user removes a tool. For example, a video can be recorded while any drawer is open to capture a user interaction. While this feature can help support technical features such as identifying a user and identifying removed tools, a video of the transaction can help when the user believes that the system malfunctioned and that the transaction never occurred. For example, a supervisor can provide the recorded video as evidence to show that the user did in fact remove the tool. Similarly, such a video can provide exonerating evidence that a user returned a tool. This can also be useful to show if a user returned a tool with a hand that is full of grease or grime and has thus dirtied the tool or drawer. To maximize efficiency, the system can vary the frame-rate of the video, the keyframe distance of the video, and/or the compression of the video. In some embodiments, the system can extract one or more frames from the video that the system determines are adequate to represent the transaction.

Figure 4:
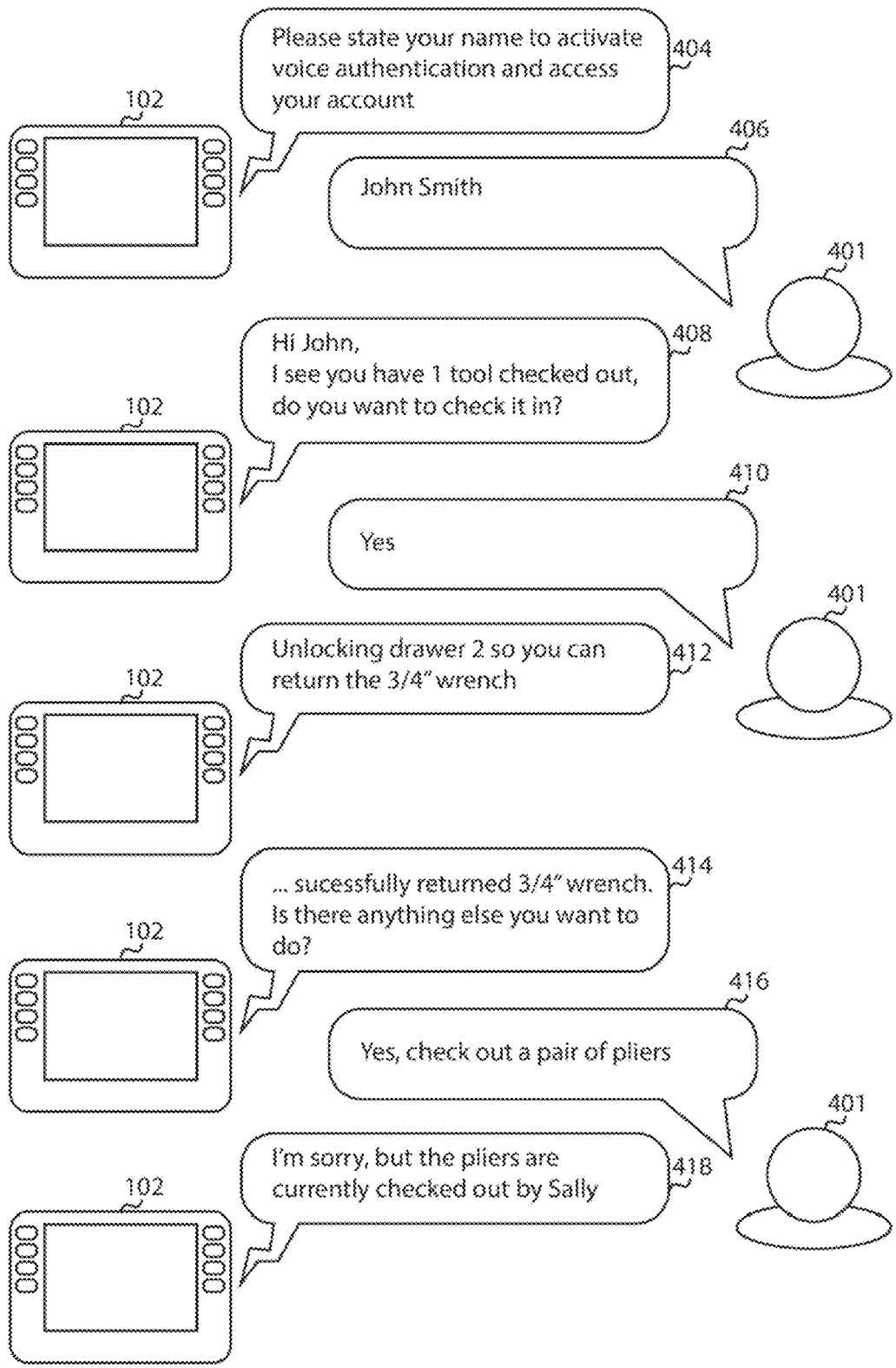
FIG. 4 illustrates an exemplary interaction flow between a user and an inventory device.

FIG. 4 illustrates an example interaction flow between a user 401 and an inventory device 102. There can be multiple interaction sensors and interaction techniques. For example, the inventory device 102 can include a keyboard, a microphone, a camera, a pin-pad, a touchscreen, etc. for receiving user input.

In the interaction presented in FIG. 4, the user can initiate a transaction. For example, the user can walk up to the inventory device 102 which can automatically detect the proximity of the user 401. The system can also detect the presence of the user by detecting a keycard, key fob or other physical device on the user 401. The system can have a motion detector (e.g., an infrared detector) that detects when the user 401 is close. The system can detect the user is close by the user touching the tool cabinet 104 chassis or attempting to open a drawer 204 of the tool cabinet 104.

The user 401 can be authenticated with the inventory device 102. For example, the inventory device 102 can prompt the user 401 to say his name 404. After speaking his name 406, the system can analyze the response to determine the user account associated with the user and can also determine if the voice pattern matches a saved voice pattern associated with the user account. Other authentication techniques are contemplated to be used in addition to or alternative to voice authentication. For example, a user can input a PIN, the user can provide a fingerprint, the inventory device 102 can do facial recognition (2D or 3D), the user can speak a passcode, the user can provide a one-time passcode provided by a security key, the inventory device 102 can detect a portable electronic device associated with the user 401 (e.g., a phone can be detected based on an associated Bluetooth or WiFi address), the user can supply authorization on a portable electronic device, the user can supply a tangible key (which may transmit digital information), etc. The inventory system may require a more secure form of authentication at first and then require less secure forms of authentication. For example, the system may require a fingerprint when a user first accesses the tool cabinet 104 for the day while requiring a key fob for other transactions that day.

The inventory device 102 can greet the user 401, provide a status of the user's account, and ask the user what the user wishes to do with the tool cabinet (at step 408). For example, the system can determine that the user 401 has a tool checked out and can ask if the user wishes to return the tool. If the user has no tools checked out, the system need not inquire whether the user wishes to check in a tool, the system can assume that the user 401 only wishes to check out a tool and can proceed to a different part of a conversation flow.

If the user 401 indicates that he wishes to return a tool 410, the system can then determine the relevant portion of the tool cabinet 104 and unlock that portion so that the user 401 can return that tool 412. Each tool can have a data object with the inventory system. The system can use the data object to identify the tool, name the tool, determine which user is in possession of the tool, determine the location of the tool, etc. If the tool cabinet 104 is unable to receive the tool (e.g., there is a copy of the tool already in the place that the tool would be placed at), the inventory device 102 can indicate another tool cabinet 104 that does have capacity to receive the tool.

When a user 401 indicates that he wishes to return a tool, the system can determine which tools are checked out to the user 401 and can unlock the appropriate drawers 204 associated with the tools. The inventory device 102 can indicate where in the drawer the tool should be placed. For example, the inventory device 102 can illuminate the physical location in the drawer or can provide a diagram on the display instructing the user where to place the tool. If the user places the tool in the wrong location, the inventory device 102 can provide immediate feedback (e.g., before the user closes the drawer) to warn the user that he has misplaced the tool.

When a user returns a tool, the system can log the transaction with the user's account. If the user was late in returning the tool then the system can record an infraction and inform necessary parties such as a supervisor. If another user was waiting for the tool, the system can alert the other user of the tool's availability (e.g., on a portable electronic device of the user).

The system can report that the tool was successfully returned and inquire if the user wishes to do further actions 414. The user can request to check out a tool such as a pair of pliers 416. The system can then determine whether the tool cabinet 104 has a pair of pliers available. If the tool is unavailable, then the system can so indicate. For example, the inventory device 102 can indicate that the tool is checked out by Sally 418. The system can review a database that indicates that a user had checked out a tool and can inform the inquiring user which user has the tool.

It is not necessary for a first user to return a tool so that a second user can take possession of the tool. For example, the two users can inform the inventory system that they are making the exchange on the factory floor. This can be facilitated by a portable electronic device (e.g., a multipurpose device such as a phone or a purpose-specific device such as a portable inventory device 102) which can verify each user's identity as well as record the transfer.

The system might determine that the user does not have access credentials to retrieve the tool. The inventory device 102 can then tell the user that she is not authorized. Some tools might require elevated permissions for retrieval. For example, the system can require authorization from a supervisor to permit a user to retrieve the tool. It can then contact the supervisor requesting authorization.

While FIG. 4 illustrates one conversation flow, other interaction flows are contemplated. For example, a user can ask whether all tools have been returned to the tool cabinet 104, what tools are checked out of the tool cabinet 104, who checked out a particular tool, etc. This may be useful for a supervisor to perform an audit at the beginning or end of a shift. Another interaction includes a user operating a touchscreen and/or buttons of inventory device 102 to check in and check out tools.

Figure 5:
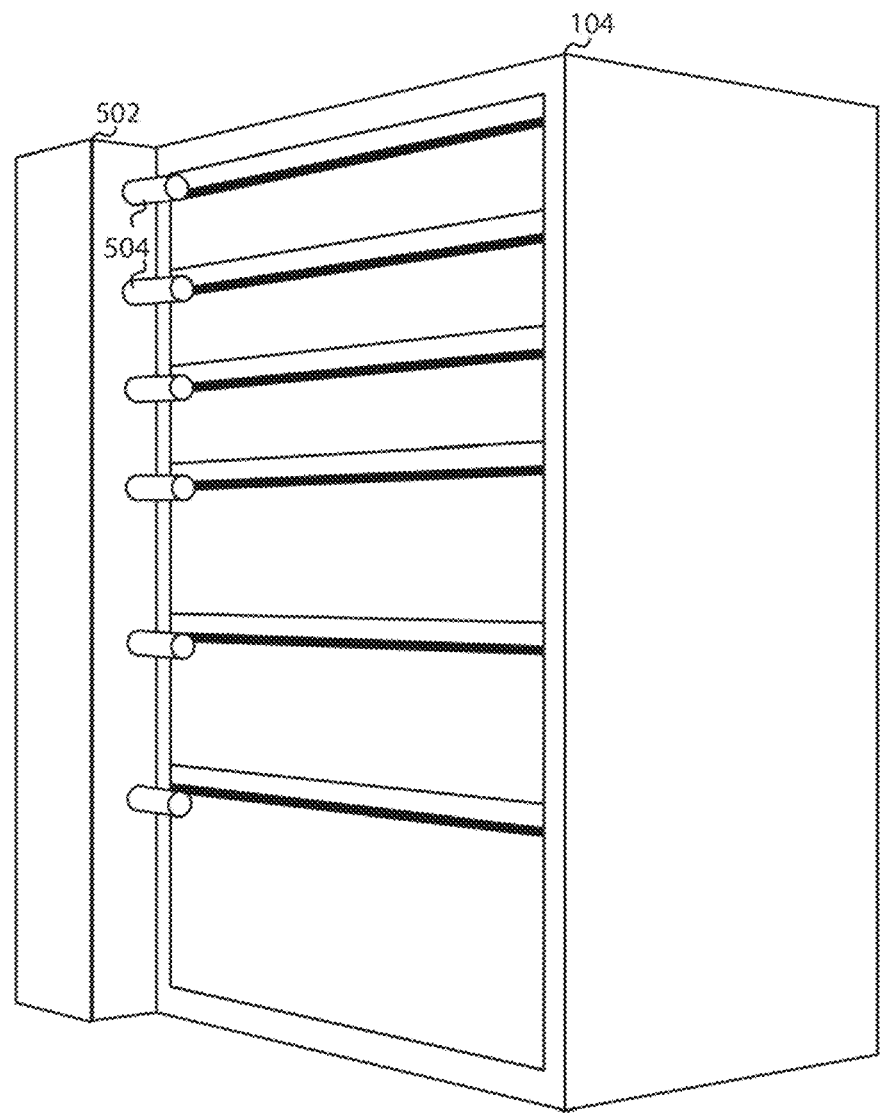
FIG. 5 illustrates an exemplary locking mechanism.

FIG. 5 illustrates an example locking mechanism 502. The tool cabinet 104 can have locks to prevent unauthorized access. The tool cabinet 104 can have internal locking mechanisms that can provide an interface for the inventory device 102 to engage in order to lock or unlock the cabinet or drawers of the cabinet. For example, see FIG. 10 where the locking mechanisms 1003 are shows on the back of the cabinet so when the back panel 1001 is closed, the locking mechanisms are not accessible directly to the use. The interface can be digital or mechanical. For example, the inventory device 102 can send a digital signal to a lock to engage or disengage the lock; similarly the inventory device 102 can provide a mechanical force that engages or disengages a lock.

When the tool cabinet 104 is idle with no users logged in to inventory device 102, the locks can all be engaged to prevent unauthorized access. When a user authenticates with the inventory device 102, the system can disengage all locks, or at least unlock the drawers that the user has permission to access. When a user opens a drawer, the system can activate the locks on all other drawers to prevent the tool cabinet 104 from falling over (which might occur if too much weight from drawers is extended form the tool cabinet 104). When the user closes the drawer, the appropriate locks can disengage. Once a user logs out, all locks can engage or disengage as needed or appropriate.

The tool cabinet 104 (excluding the inventory device 102) might not have an internal locking mechanism or might have locking mechanisms without an interface usable by the inventory device 102. The inventory device 102 can include a locking system 502 that restrains access to the tool cabinet 104. As depicted in FIG. 5, the inventory device 102 can actuate a mechanical piece 504 that prevents a respective drawer from opening. This mechanical piece 504 can obstruct the path that a drawer would take when opening. The mechanical piece can be rotated into place, can be extended into place, or otherwise actuated to provide obstruction. When the respective drawer should be unlocked, the mechanical piece can be returned so that the drawer's movement is unobstructed. The mechanical piece maybe located inside or outside the drawer.

The lock on the drawers can be magnetic or any other locking means. For example, a sufficiently powerful electromagnet can be in contact with a magnetically conductive element of a drawer (e.g., the electromagnet can be placed at the rear of the drawer) preventing the drawer from opening. The electromagnet can be placed on the drawer as well.

In addition or alternative to a physical lock that physically restrains access, other types of access prevention techniques can be utilized. For example, an alarm can sound when unauthorized access is detected. Security personnel can be notified of unauthorized access.

Figure 6:
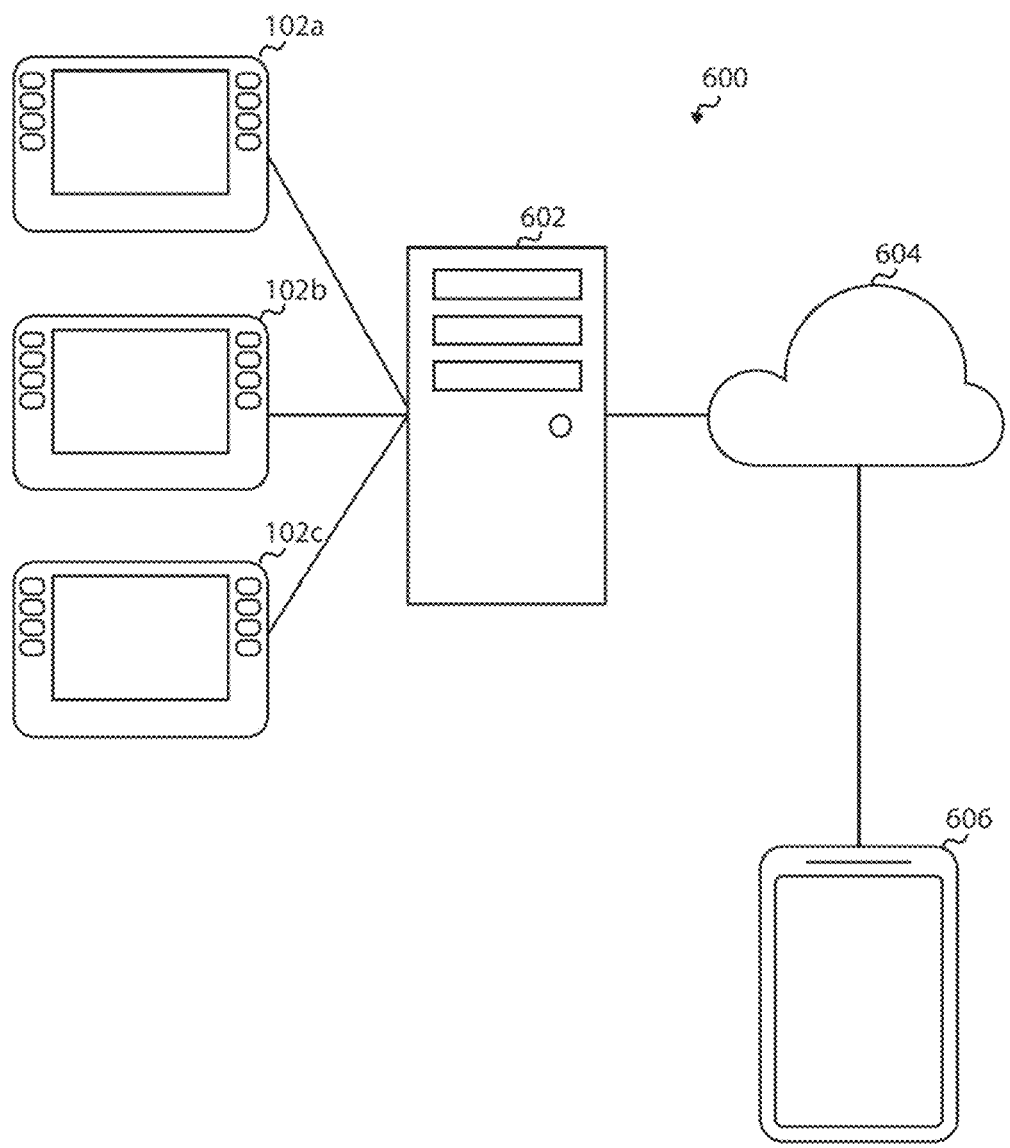
FIG. 6 illustrates an exemplary network of components of an inventory system.

FIG. 6 illustrates an example network 600 of components of an inventory system. The inventory device 102 can be networked with a centralized system. An inventory system can include multiple inventory devices (e.g., 102a, 102b, and 102c), a centralized inventory database 602, terminal device(s) 606, etc. The centralized inventory database (e.g., a computing system implementing the database) can be directly connected to the inventory device 102 and terminal device 606 (e.g., via a local area network, Bluetooth, wireless protocols, etc.). The centralized inventory database 602 can communicate through a network such as the Internet 604 to the inventory devices 102 and/or the terminal device 606. The centralized inventory database 602 can be "cloud" based wherein it is packaged as a virtual machine, container, or similar package and processed by generalized computing architecture.

A user can interact with the inventory system through a terminal device 606. The terminal device 606 can include an inventory device 102, a stationary terminal such as a desktop computer, a portable electronic device such as a tablet, "smart" phone, watch, and/or other human-interface-devices. The terminal device 606 can indicate the current status of particular tools. For example, the terminal device 606 can provide a log of different users who have had access to the tool including when the respective user checked out or checked in a tool. The terminal device 606 can indicate policy infractions of the users. For example, the terminal device 606 can indicate when a user returned a tool beyond an allowed time. Certain tools may have a limit to how long they may be checked out (e.g., a predetermined number of minutes, hours, or days). Some tools must be returned before shop-close, before a task can be marked complete, etc. The system can identify and indicate if a tool was checked out by one user but returned by a different user. Some terminal devices 606 can enable a user to transfer custody of a tool to another user. For example, a user can use an application on their phone to indicate that they are transferring a tool to another user; the other user can then provide authentication and authorization for the transfer.

The inventory device 102 can communicate with other inventory devices 102 associated with other tool cabinets 104. Inventory devices 102 can communicate in an ad-hoc manner without a centralized system. Or can communicate with other inventory devices that have been linked with a centralized system. For example there can be a centralized database that contains all the data from all the inventory devices in the system. One inventory device 102 can be a "master" inventory device 102 that is established as having authoritative information while other inventory devices 102 can communicate with the master device to update or retrieve information. The inventory devices 102 can also communicate as part of a larger inventory system as described herein.

When a user wishes to retrieve a tool, the inventory system (e.g., through a terminal such as an inventory device 102 or a portable electronic device) can indicate which, if any, tool cabinets 104 contain the tool. The inventory system can also indicate if a user has the tool. The inventory system can indicate any limitations in place for the tool. For example, the system can indicate that the user is not authorized for the tool, that the tool is not necessary for any tasks or responsibilities for the user, that tool use will require supervisor permission (e.g., provided by the supervisor at a terminal), how long the user can have the tool checked out, when the tool should be returned, etc.

Figure 7:
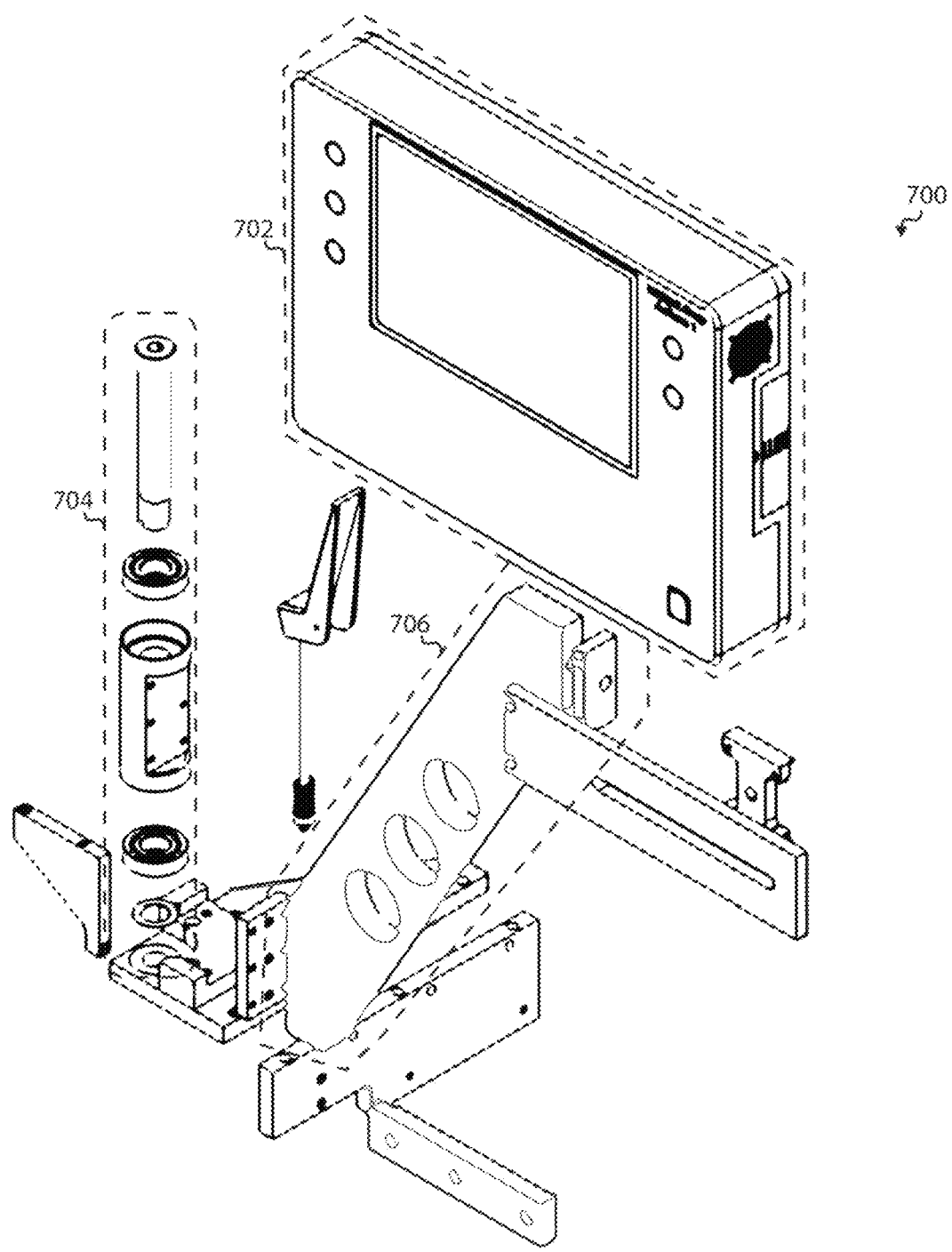
FIG. 7 illustrates an exemplary exploded view of an inventory device.

FIG. 7 illustrates an example exploded view 700 of an inventory device 102. The inventory device 102 can include a rotating mechanism 704, which enables the arm 706 to rotate as depicted in FIG. 2. The inventory device 102 can include an interface 702. The interface 702 can include a screen, buttons, electrical interfaces, sensors, etc. The interface 702 can have a battery or an electrical cord through which to obtain power, or it could contain solar panels to provide electrical energy.

The principles disclosed herein are applicable to a variety of environments. For example, in a hospital environment, a storage locker can contain medical supplies. A doctor can authenticate herself and provide a patient identifier (e.g., scanning a barcode) and request particular consumables or tools. The system can ensure that only the consumables and tools that are relevant to the patient and permitted for administration by the doctor are accessible. This can help prevent misuse by care providers and can help prevent errors. The system can also ensure that items, once used, are properly accounted for. Consumables can be accounted for by monitoring when they are disposed of (e.g., a needle can be tracked as it is placed in a sharps container) or otherwise used. This can help prevent medical supplies being left at a surgical site.

Another environment is an arms locker. For example, police officers' guns, ammunition, and tactical equipment, can be left in an arms locker when not needed. When the police officer is on duty, he can check out the various materials he needs for his assignment. At the end of his shift, he can return his materials. Any missing materials can be logged and reported as necessary.

Another example environment is a store or vending machine where customers can purchase items for sale. The system can verify the customer's identity, how much credit the customer has on his account, and can grant access to items accordingly.

Another example embodiment is a research laboratory where high-risk items are inventoried. For example, a chemistry lab might contain toxic or combustible materials, and a biology lab might contain viruses or bacteria that are dangerous, etc. Another embodiment includes a secret area where materials are protected by trade secret, state secrets, or other binding laws or codes that require that items are kept on site.

The following are a few example processes, sensors, interactions, and user interface displays, that can be performed by the system described herein.

Main Screen: This is the front face of our GUI. Here we have two options. Registration and Help. Once we activate app, our actuators get locked and we are detecting for user input through buttons. Our fingerprint sensor is also working and waiting for user's authentication to either User/Artisan Screen of Manager Screen. Once we transition from Main screen to another screen, we shut off our finger print sensor.

From Main Screen to Help: We transition to a newer screen we call genericlist_screen. In this list, we populate items in list according to previous screen. In this screen, the user can scroll and select video tutorial then press 'Select' button. This will take the user to a video player that plays the desired video.

From Main to Register: When the user presses 'Register', he is taken to the keyentry screen.

From Main to Manager: Once the user's fingerprint is read in the main screen and it matches with registered fingerprint as a manager, the system transitions to the Manager screen.

From Main to User: Once the user fingerprint is read in the main screen and it matches with a registered fingerprint as a bona fide user, the system transitions to the User screen.

Keyentry Screen: Here the system requests, for example, a 6 digit key from user (this key is given by manager). The key type can either be a manager or a user. Once user enters the correct key, he is taken to 'registerFp screen'.

RegisterFp Screen: Here, the user is required to place his thumb on the fingerprint sensor. This is required three times for verification, if all three times, the steps are performed correctly, the user gets registered. If even one step fails, he has to start from step 1 again. Once the user is registered successfully, he is taken back to main screen after brief timed period.

Manager Screen: In this screen, there are the following options: a) Tool Management: Go to Tool Management Screen and b) User Management: Go to User Management Screen.

Help: Go to genericlist screen, populate list according to tutorial videos for manager profile.

Utilization Audit: Go to genericlist screen, populate list according to sessions recorded during User Screen. Here, the manager can check session details of the artisans. First a session is selected, then one is able to view last transaction images of each drawer. Afterward, the user can go further and view session video along with prompt messages that highlight each transaction detail.

Tool Management Screen: In this screen, the user has an option to view logs related to the tools. The following are some of the options. 1) Remove Tool: Opens genericlist screen and shows tools that have been removed by manager. Here the user has the option to select and remove tools due to two reasons, for example, because it is damaged or for calibration. Once the tool is removed, it will not be listed in any screens, or will not be updated during the artisan's transaction. 2) Damaged Tool: Opens genericlist screen and shows a list of tools that have been reported as damaged by artisans. The manager can delete items from this list. Once an artisan reports a new tool as damaged, the manager will receive a notification once he logs in, and this notification will go away once he views this Damaged Tool List.

Calibration Tool: Opens genericlist screen and shows the list of tools that are scheduled for calibration. The manager can add new tools in this list. Once the scheduled date for tool calibration passes, the manager would see a calibration notification once he logs in. This notification won't go away until the manager removes and entry in this list.

User Management Screen: In this screen, the manager can select an option related to current users. Current User: Opens genericlist screen and shows currently registered users. The manager has the option to delete and remove a user or add a user.

User Key: Opens genericlist screen and shows keys that are or can be used for registration. Validity of keys is also shown and this tells whether this key can be used for registration or not. The manager has an option to delete these keys. He can also register new keys.

User/Artisan Screen: In this screen, we have three main features including Front Frame. This shows real time update of tools state (removed/placed). This is done by using computer vision in the background. The camera is looking at the drawers. It first detects whether any drawer is open or not. If no drawer is open, it will open all locking actuators so an artisan may open any drawer of their choice. After it detects an open drawer, it locks all other drawers to make sure no two drawers are open at the same time. It then proceeds on detecting the state of tools in the opened drawer (such as present or not present).

Left Table: This shows transaction alerts of the toolbox. For example, if no drawer is open, it will alert the artisan that is currently in the identifying drawer mode, and if a drawer is open it will alert that a transaction can be made now. It also shows the number of tools that have are set for calibration/repair in the drawer.

Right Table: This shows details regarding a tool which is removed or placed. It records a timestamp each time a particular tool is placed or removed from the drawer.

Aside from these features, an artisan's session is also recorded along with the tables, which a manager can view in Utilization Audit. An artisan can also report damaged tool in this screen. The procedure for reporting a tool is similar to those of removing tool in manager profile.

Figure 8:
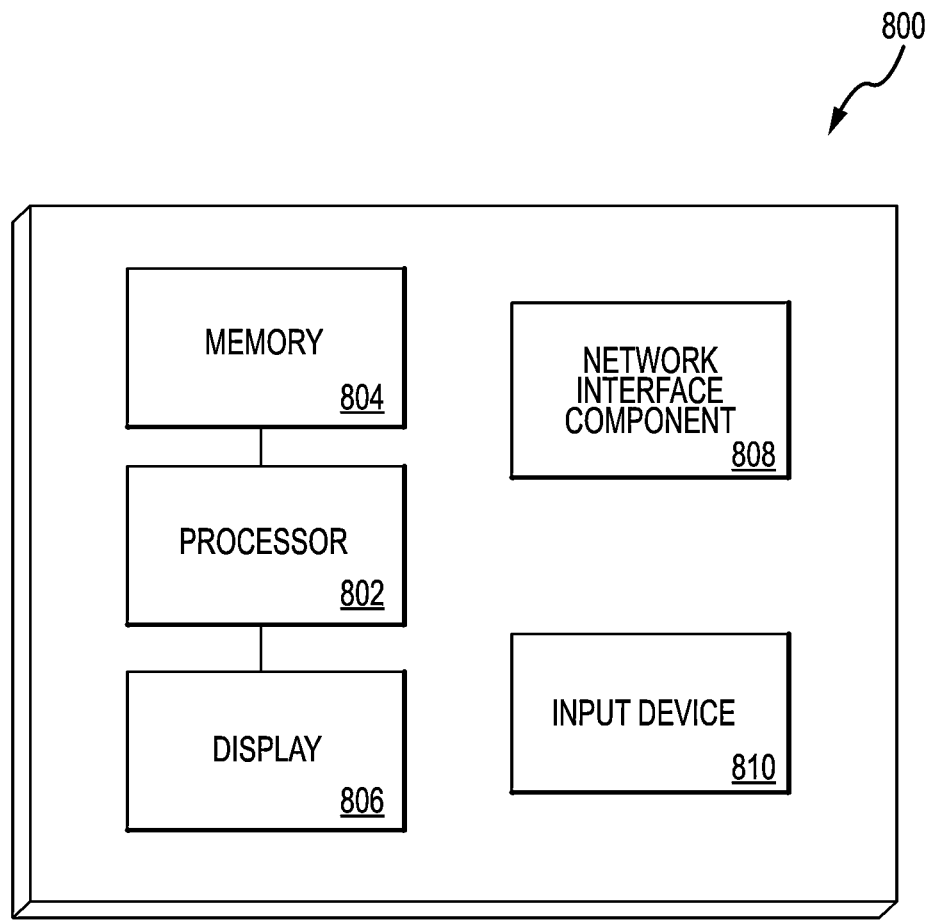
FIG. 8 illustrates exemplary components of a computing device that can be utilized in accordance with various embodiments.

FIG. 8 illustrates a logical arrangement of a set of general components of an example computing device 800 that can be used to implement aspects of the various embodiments. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 810 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more network interface components 808 for communicating over various networks, such as a Wi-Fi, Bluetooth, RF, wired, or wireless communication systems. The device in many embodiments can communicate with a network, such as the Internet, and may be able to communicate with other such devices.

Figure 9:
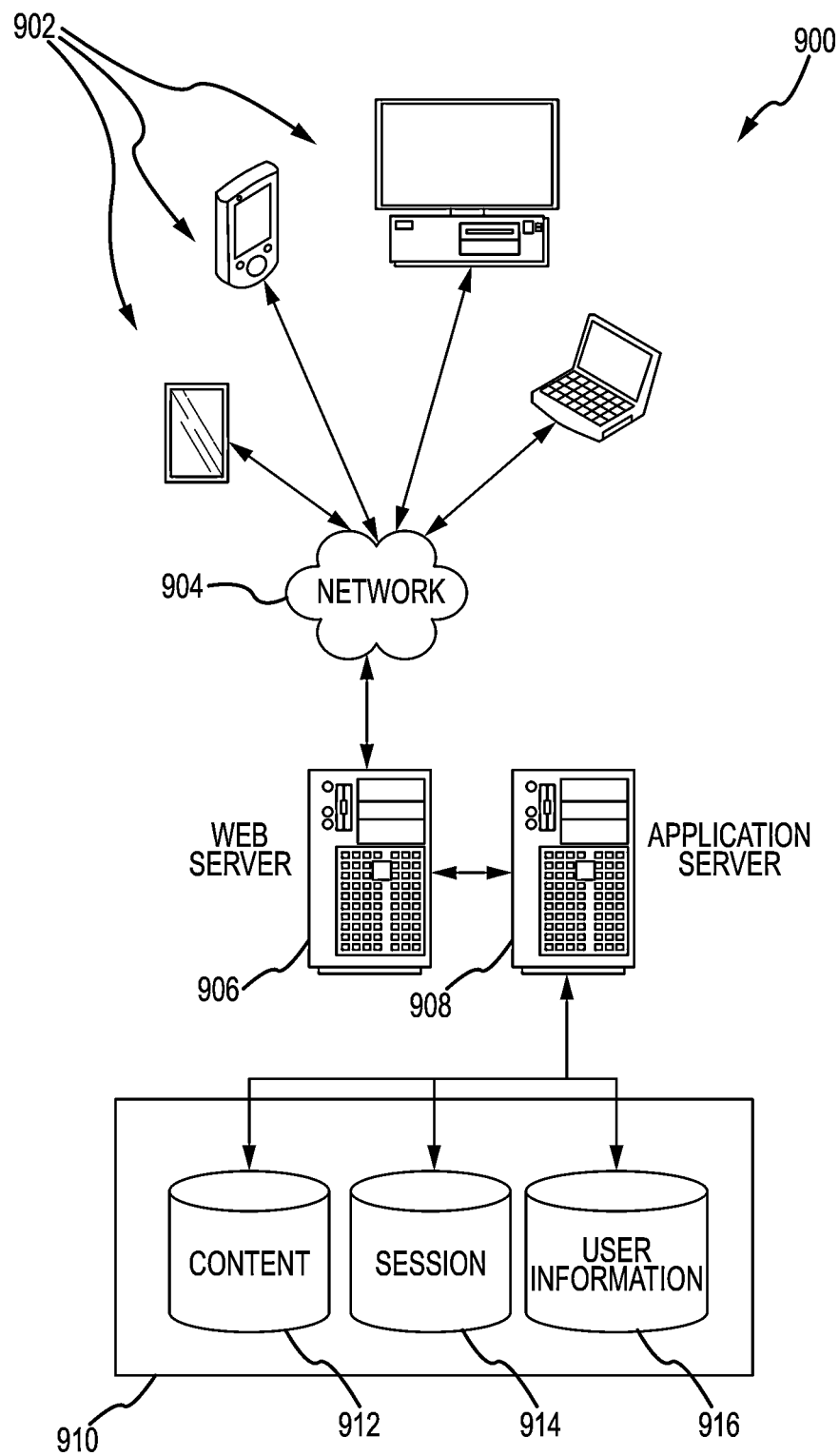
FIG. 9 illustrates an exemplary environment in which aspects of the various embodiments can be implemented.

As discussed, different approaches can be implemented in various environments in accordance with the described embodiments. For example, FIG. 9 illustrates an example of an environment 900 for implementing aspects in accordance with various embodiments, such as to obtain content to be rendered by a 3D or VR headset, or other such device or display. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. This can include, for example, image information captured for the face of a user or a request for virtual reality content to be rendered on a virtual reality headset or other such device. Examples of client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. An inventory management system comprising an inventory device attached to a tool cabinet having a plurality of drawers,
wherein the inventory device comprises:
a) an interface system for engaging an inventory system,
b) an arm for holding the interface system and wherein the arm is attached to the tool cabinet and wherein the arm allows for movement of the interface system;
c) a downward facing camera for inventory tracking wherein the camera views each of the plurality of drawers of the tool cabinet when each drawer is opened,
wherein the at least one camera takes an image of at least one drawer for the plurality of drawers at the beginning of a transaction and takes another image of the resultant state of the drawer at the end of the transaction, and
wherein the inventory system compares the image from the beginning of the transaction with the image of the resultant state of the drawer at the end of the transaction to determine changes in the drawer that occurred during the transaction.

2. The inventory management system of claim 1 wherein the drawers have an insert having cut outs for each tool housed in that drawer.

3. The inventory management system of claim 2 further comprising sensors for detecting whether a tool is present or not.

4. The inventory management system of claim 1 comprising more than one camera for inventory control.

5. The inventory management system of claim 1 wherein the inventory device interfaces with mechanical parts of the tool cabinet.

6. The inventory management system of claim 5 wherein the mechanical parts of the tool cabinet include drawer locks.

7. The inventory management system of claim 1 wherein the inventory device automatically moves into position for imaging the drawer in the tool cabinet when the drawer is unlocked or opened.

8. The inventory management system of claim 1 wherein a computing device is located on the back side of the tool cabinet.

9. The inventory management system of claim 1 wherein the interface system indicates tool removal, tool return, improper tool return locations, and damaged or dirty tool returns.

10. The inventory management system of claim 1 wherein the image of at least one drawer at the beginning of the transaction is used to identify and locate tools in the at least one drawer.

11. The inventory management system of claim 10 wherein the identity and location of the tools is determined by image segmentation processes, neural networks, or computer vision techniques.

12. The inventory management system of claim 1 wherein the camera is positioned along a bottom of the interface system.

13. The inventory management system of claim 1 wherein the system schedules tool maintenance based on a log of checked-out time.

14. The inventory management system of claim 1 wherein the camera will zoom or focus on one of the plurality of drawers when opened.

15. The inventory management system of claim 1 wherein the camera records a video from the beginning of the transaction to the end of the transaction.

16. The inventory management system of claim 1 wherein the interface system and arm are detachable from the tool cabinet.

17. The inventory management system of claim 1 wherein the camera is used to generate or augment a three-dimensional model of the tool cabinet and tools.

18. The inventory management system of claim 9 wherein the interface system alerts a user when an improper tool return location is identified.

19. The inventory management system of claim 4 wherein the at more than one camera is positioned away from the tool cabinet.

20. The inventory management system of claim 4 wherein the camera detects a hand or a robotic arm that removes or replaces a tool.

\* \* \* \* \*